United States Patent [19]

Jones

[11] Patent Number: 4,904,991

[45] Date of Patent: Feb. 27, 1990

[54] DISPLAY UNIT SUBJECT TO AMBIENT LIGHT HAVING LIGHT-REFLECTIVE AND LIGHT-EMITTING DISPLAY ELEMENTS

[75] Inventor: John W. D. Jones, Stonehouse, England

[73] Assignee: Smiths Industries Public Limited Company, London, England

[21] Appl. No.: 126,983

[22] Filed: Nov. 30, 1987

[30] Foreign Application Priority Data

Dec. 10, 1986 [GB] United Kingdom ............... 8629488

[51] Int. Cl.⁴ .............................................. G08B 5/00
[52] U.S. Cl. .......................... 340/815.15; 340/815.16; 340/815.17; 340/971; 362/23; 362/31; 362/62
[58] Field of Search ............... 340/756, 757, 762, 766, 340/767, 782, 793, 815.03, 815.06, 815.07, 815.15-815.20, 971-973, 977-980; 362/23, 26, 27, 28-31, 62; 368/67, 68, 83, 227, 241

[56] References Cited

U.S. PATENT DOCUMENTS

| | | | |
|---|---|---|---|
| 3,668,623 | 6/1972 | Csaposs | 340/977 |
| 3,754,121 | 8/1973 | Delay et al. | 340/767 |
| 3,757,511 | 9/1973 | Burgess et al. | 368/83 |
| 3,890,614 | 6/1975 | Argentieri et al. | 340/977 |
| 3,992,873 | 11/1976 | Awalt | 368/68 |
| 4,392,750 | 7/1983 | Mettler | 368/67 |
| 4,622,548 | 11/1986 | Andres et al. | 340/971 |
| 4,648,690 | 3/1987 | Ohe | 362/26 |

Primary Examiner—Gerald Brigance
Assistant Examiner—Richard Hjerpe
Attorney, Agent, or Firm—Pollock, Vande Sande & Priddy

[57] ABSTRACT

A display unit has a transparent front panel one surface of which carries reflective markings that are illuminated by internal reflection in the panel from edge-mounted bulbs. Behind the panel are located light-emitting display devices such as provided by LED's. Illumination from the bulbs is controlled by manually adjusting a rheostat 36. The brightness of the display devices is controlled by means of two photodiodes. One photodiode responds to the level of ambient light falling on the front panel; the other photodiode is shielded from ambient light and responds to light from an additional bulb connected in parallel with the edge-mounted bulbs and having the same illumination characteristics. The brightness of the display devices is thereby automatically decreased when ambient light levels fall and increased when the markings are brightly illuminated, so that they are not masked by bright markings.

6 Claims, 2 Drawing Sheets

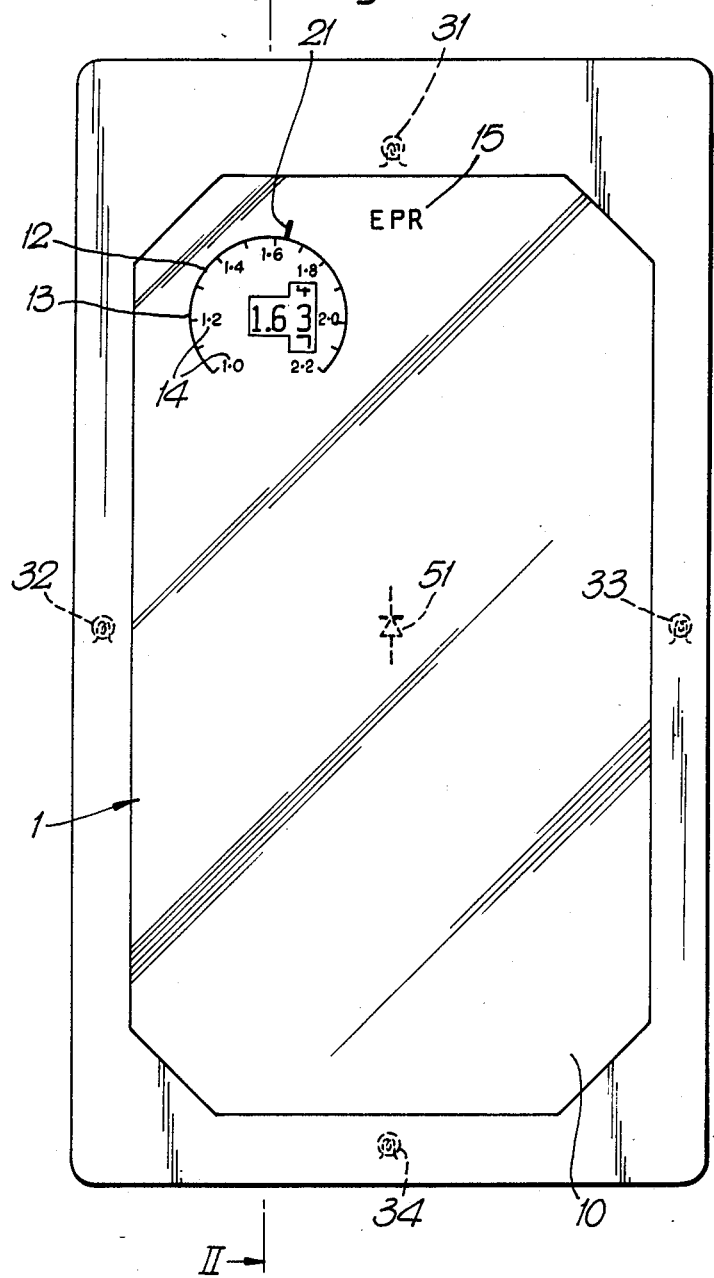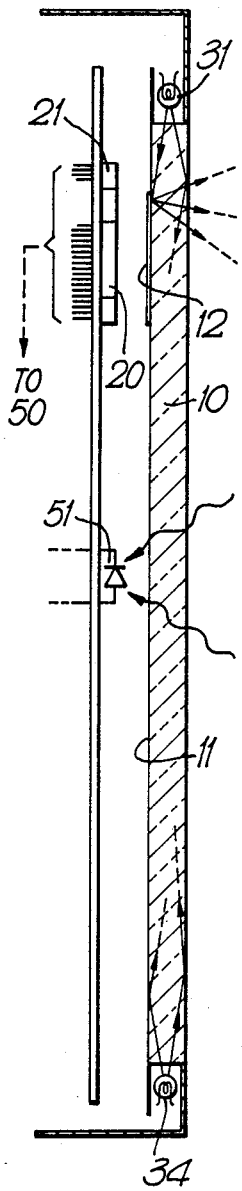

DISPLAY UNIT SUBJECT TO AMBIENT LIGHT HAVING LIGHT-REFLECTIVE AND LIGHT-EMITTING DISPLAY ELEMENTS

BACKGROUND OF THE INVENTION

This invention relates to display units.

The invention is more particularly concerned with display units in which a display representation is provided by energization of light-emitting elements together with illumination of light-reflective regions.

Many forms of instruments and other display units include both light-emitting elements, such as light-emitting diodes, and reflective regions such as printed markings. In normal daylight, the light-emitting elements must be sufficiently brightly energized to ensure that they are easily readable, while ambient light provides sufficient illumination of the reflective markings or other elements.

In subdued light, the level of energization of the light-emitting elements is reduced, while illumination, in addition to ambient light, may be required of the reflective markings to make them clearly visible.

In night conditions, greater illumination of the markings is required while a lower brightness level is needed for the light-emitting elements.

For some applications, such as on aircraft flight decks, the control of apparent brightness of the display is very important since both the light-emitting and light-reflective elements must always be clearly visible in conditions that vary from bright sunlight to pitch darkness. It is also important that, in darkness conditions, the brightness of the display does not distract the user from other displays, controls or from faintly illuminated objects outside the aircraft.

Conventional display units include a light detector responsive to ambient light which is coupled to the drive circuit of the light-emitting elements, so that the brightness of the elements is varied directly in response to ambient light levels. In this way, the light-emitting elements are energized to a higher level at bright ambient light conditions than in dark conditions. The level of illumination of the reflective markings is controlled manually by the user as he desires, so that the markings are more brightly illuminated in dark conditions.

This previous arrangement, however, cannot readily provide a clearly visible display especially at low ambient light levels, because the relatively high level of illumination required for the reflective markings will mask the relatively low brightness of the light-emitting elements produced automatically. This generally results in the user compromising by setting a lower than ideal brightness for the reflecting markings, or by the display being arranged to produce a higher than desirable brightness level for the light-emitting elements.

In some displays, it may be possible to locate the light detector so that it receives both ambient light and light from the source used to illuminate the reflective elements. In such an arrangement, a degree of compensation is automatically provided when ambient light levels are low, and when light levels from the illuminating source are high.

However, in many displays it is not possible to do this, such as when the reflective elements are markings on a face of a transparent plate that is edge-illuminated through the thickness of the plate.

BRIEF SUMMARY OF THE INVENTION

It is an object of the present invention to provide a display unit that can be used to alleviate these problems.

According to the present invention, there is provided a display unit including a light-emitting element, a light-reflective region, first means for illuminating substantially only said light-reflective region, a first light-responsive detector arranged to provide an output indication of the amount of ambient light incident on the unit, a second light-responsive detector shielded from ambient light, second illuminating means arranged to illuminate the second detector, the second illuminating means having the same illumination characteristics as the first illuminating means such that the second detector provides an output indicative of the illumination provided by the first illuminating means, and control means arranged to control the brightness of the light-emitting element in accordance with both the level of ambient light as detected by the first detector and the level of illumination of the light-reflective region as indicated by the second detector.

The first illuminating means and the second illuminating means are preferably connected in parallel and may include filament bulbs. The unit may include a device by which the first illuminating means can be manually adjusted. The light-reflective region may be marking on a face of a transparent plate, preferably the rear face, the first illuminating means being located at an edge of the plate to direct light transversely through the plate onto the marking. The plate may be located in front of the light-emitting element. The light reflecting region may be provided by reflective marking indicia against which the display representation of the light-emitting element is provided.

An aircraft display unit according to the present invention will now be described, by way of example, with reference to the accompanying drawings.

BRIEF DESCRIPTION OF THE DRAWINGS

FIG. 1 is a front elevation showing the front panel of the unit;

FIG. 2 is a sectional side elevation along the line II—II of FIG. 1, showing a part of the display unit.

DESCRIPTION OF PREFERRED EMBODIMENT

Figure 3:
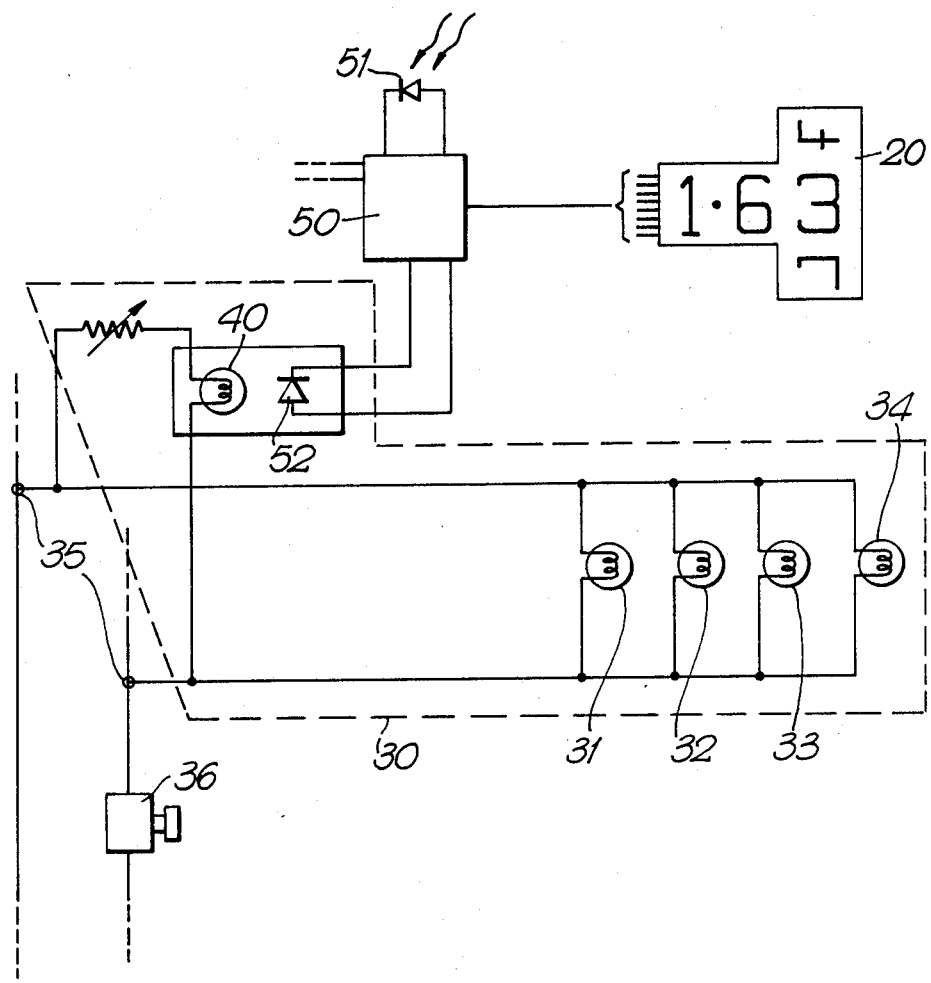
FIG. 3 illustrates schematically the electrical circuits in the display unit.

With reference first to FIGS. 1 and 2, the aircraft display unit has a front panel 1 on which a display representation of various aircraft performance variables are provided. The front panel 1 comprises a transparent glass plate 10 on the rear face 11 of which is printed various reflective markings or regions 12. In FIG. 1 these markings take the form of an arcuate scale 13 with printed numbers 14 at points along the scale, and various printed legends 15. Just behind the panel 1 there are mounted various light-emitting devices 20 and 21 that are visible through the panel. One of these devices 20 takes the form of a matrix array of light-emitting diodes which provides a numerical display, such as described in GB 2016781B, centrally within the arcuate scale 13. The other device 21 comprises an arcuate row of short radially-extending light-emitting diodes outside the arcuate scale 13. The display representation is provided by energizing an appropriate one of the LED's of the device 21, so that it indicates a value along the scale 12, and by energizing LED's in the device 20 to provide an equivalent numerical representation of the same value.

The markings 12 on the plate 10 are illuminated by means of four filament bulbs 31 to 34 located around the edge of the plate. When the bulbs are energized they emit light which passes transversely of the plate within its thickness by total internal reflection. In this way, the markings on the surface 11 are illuminated but substantially no light, other than that reflected by the markings, emerges out of the plate.

With reference now also to FIG. 3, the bulbs 31 to 34 are connected in parallel with one another in an illumination circuit 30 across the aircraft instrument illumination power supply terminals 35. As in common practice, the voltage at these terminals 35 is controlled by a manually adjustable rheostat 36 which also controls the illumination of other instruments and displays (not shown).

An additional bulb 40, identical in illumination characteristics to the edge-mounted bulbs 31 to 34, is connected in parallel with the bulbs 31 to 34 and is mounted within the display unit where it is shielded from ambient light and from any light produced by the bulbs 31 to 34. It will be appreciated that the illumination provided by the additional bulb 40 will vary in the same way as that provided by the bulbs 31 to 34 when the rheostat 36 is adjusted.

The display representation provided by the light-emitting devices 20 and 21 is controlled by a display driver or control unit 50. The unit 50 also controls the brightness of the devices 20 and 21 to produce a display representation of optimum brightness for the lighting conditions prevailing at the time. The display driver unit 50 receives input signals from two photodiodes 51 and 52, or similar light detectors.

The first of these detectors 51 is located so that it is responsive to the level of ambient light falling on the display and may be mounted behind the front plate 10, as shown in FIG. 1, or on the outside of the display unit.

The other photodiode 52 is shielded from ambient light and from illumination provided by the edge-mounted bulbs 31 to 34 by being located within the display unit in close proximity to the additional bulb 40 so as to respond solely to the level of illumination provided by this bulb.

The driver unit 50 is arranged to energise the devices 20 and 21 to their maximum brightness level when the output of the detector 52 indicates high levels of ambient light. As the output of the detector 51 falls, the driver unit 50 reduces the brightness of the devices 20 and 21.

When the rheostat 36 is adjusted so as to increase the illumination of the markings 12 by the bulbs 31 to 34 the output of the other detector 52 increases in response to light emitted by the additional bulb 40. This causes the driver unit 50 to increase the brightness of the light-emitting devices 20 and 21. The outputs of the two detectors 51 and 52 are, in effect combined although the two outputs may be scaled to different degrees. In this way, when the user wishes to increase the brightness of the markings, at low levels of ambient light, this results in a corresponding increase in the apparent brightness of the devices 20 and 21 so that they are not obscured by the increase in brightness of the markings.

The display described provides complete electrical isolation of the illumination circuit 30 from the display driver unit 50 so that failure or faults in the illumination circuit will not alter the display representation. Also, failure of any of the bulbs 31 to 34 or 40 will not adversely affect the illumination of other displays in the aircraft. The illumination circuit 30 in the display unit is capable of operation with ac or dc supply without affecting the ability of the display unit to adjust the brightness of the light-emitting devices in response to high illumination levels of the reflective markings.

It will be appreciated that the invention can be used in other forms of illuminated display. For example, the light-reflective region may be provided by a moving pointer. The light-emitting elements may be provided by one end of a fiber-optic cable the other end of which is optically coupled to a light source.

A similar system can be included in other forms of display unit in which the illumination of the reflective markings is effected automatically in response to a detector of ambient light levels.

What is claimed is:

1. Illumination means for a display unit of the kind visually displaying data, as for example in an aircraft instrument or the like, and being of the kind in which both light-emitting elements and light-reflective display elements are concurrently operative and in which both said light-reflective and light-emitting elements are at times subject to ambient light impinging thereon, said illumination means comprising:

first illumination means comprising at least one lamp so disposed as to illuminate substantially only said light-reflective elements, a first light detector for providing an output which is a manifestation of only the intensity of ambient light incident on said display unit, a second light detector shielded from ambient light, second illumination means having illumination characteristics substantially the same as said first illumination means, said second light detector being illuminated substantially only by said second illumination means to thereby cause said second light detector to provide an output which is a manifestation of only the intensity of illumination provided by said first illumination means on said light-reflective elements, adjustable control means for varying the intensity of illumination provided by said first illumination means, and means jointly responsive to both said first detector in accordance with the level of ambient light and also to said second detector in accordance with the level of illumination provided by said second illumination means to control the level of illumination of said light-emitting elements.

2. A display unit according to claim 1, wherein the first and second illumination means are connected in parallel.

3. A display unit according to claim 1, wherein the first and second illumination means include filament bulbs.

4. A display unit according to claim 1, including a transparent plate, and wherein said light-reflective display elements are markings on a face of said plate.

5. A display unit according to claim 4, wherein the first illumination means is located at an edge of the plate to direct light transversely through the plate onto said markings, 6. A display unit according to claim 1, wherein said light reflective display elements are reflective marking indicia against which the display representation of the light-emitting element is provided.

* * * * *